Jan. 31, 1939.  E. F. SCHNEDAREK  2,145,806
TIRE BUILDING DRUM
Filed Sept. 15, 1936  2 Sheets-Sheet 1
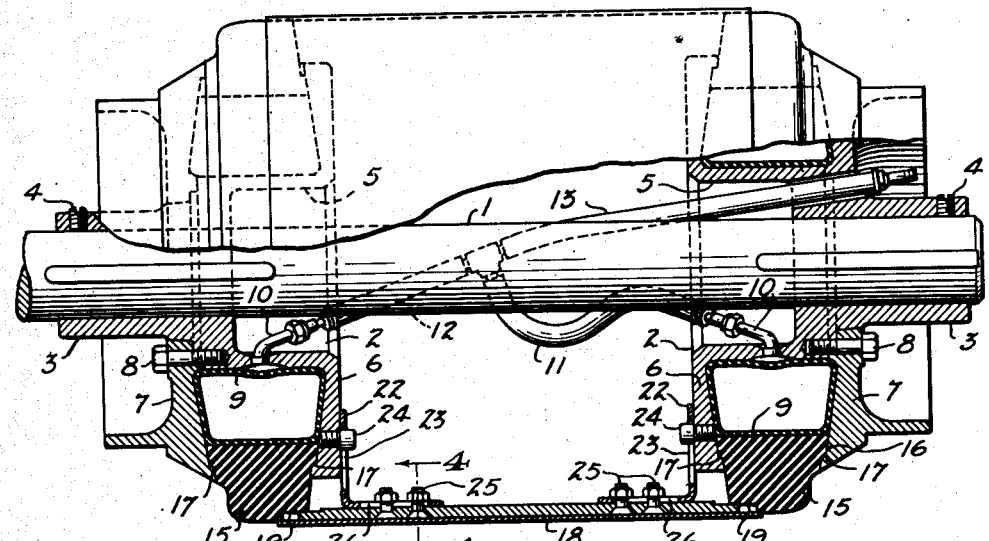
Fig. 1
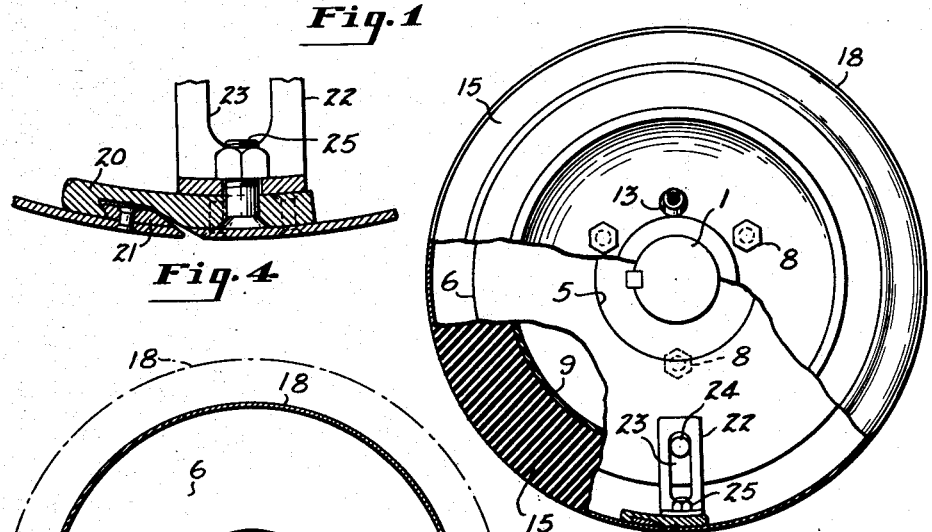
Fig. 4
Fig. 2
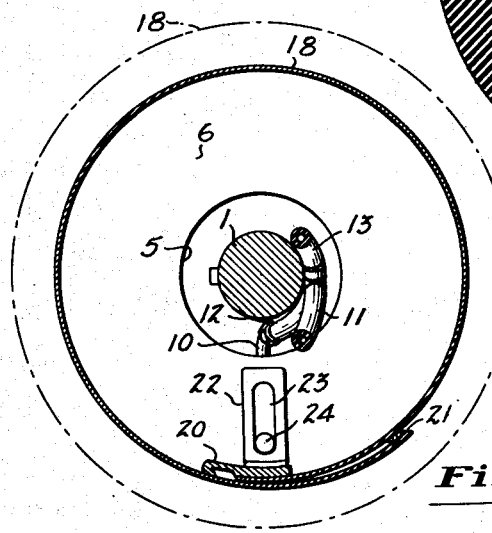
Fig. 3
INVENTOR
Emil F. Schnedarek
BY
Evans & McCoy
ATTORNEYS Jan. 31, 1939. E. F. SCHNEDAREK 2,145,806
TIRE BUILDING DRUM
Filed Sept. 15, 1936 2 Sheets-Sheet 2

INVENTOR
Emil F. Schnedarek
BY
Evans & McCoy
ATTORNEYS

Patented Jan. 31, 1939

2,145,806

UNITED STATES PATENT OFFICE 2,145,806

TIRE BUILDING DRUM

Emil F. Schnedarek, Akron, Ohio, assignor to The General Tire & Rubber Company, Akron, Ohio, a corporation of Ohio Application September 15, 1936, Serial No. 100,833

12 Claims. (Cl. 154—9)

This invention relates to tire building drums and has for its object to provide a drum which can be quickly and easily contracted to free a tire carcass which has been built thereon and which after removal of a built tire carcass may be quickly expanded to the proper diameter for the building of another tire.

More specifically it is the object of the invention to provide a cylindrical drum which has pneumatic means for expanding it to tire building size and which contracts sufficiently to permit removal of a tire upon release of the pneumatic pressure.

With the above and other objects in view the invention may be said to comprise the tire building drum as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Figure 1 is an axial section through a tire building drum embodying the invention, showing the drum expanded;

Fig. 2 is an end elevation of the drum with portions broken away to show parts of the interior construction;

Fig. 3 is a transverse section through the contracted drum;

Fig. 4 is an enlarged section taken on the line indicated at 4—4 in Fig. 1;

Figure 5:
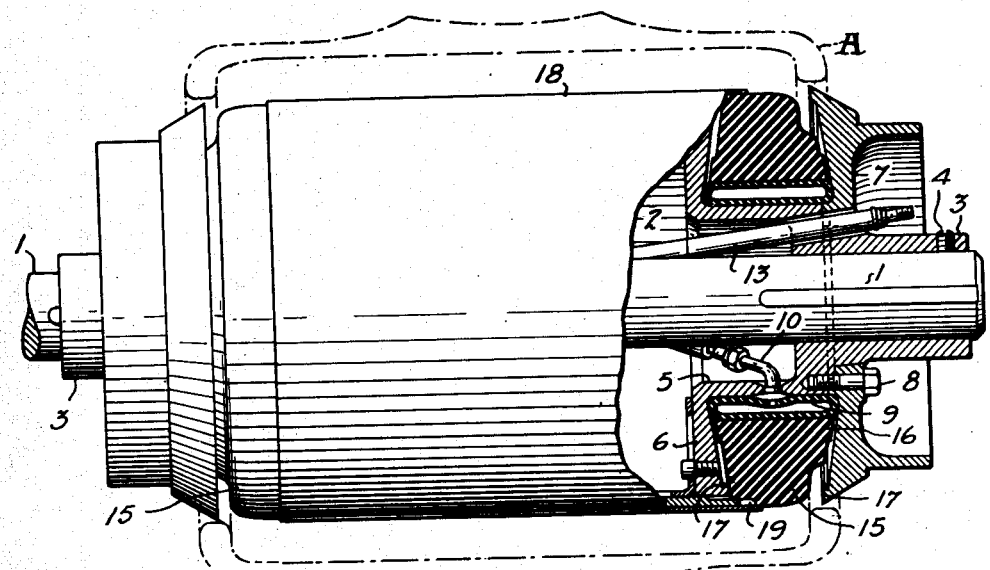
Fig. 5 is an axial section showing the drum contracted to a diameter such that the built tire carcass can be readily removed therefrom.

Referring to the accompanying drawings, the drum of the present invention is shown mounted upon a suitable supporting shaft 1, the drum being provided with spaced heads 2 which may be of identical construction, each having a hub 3 fitting upon the shaft 1 and secured in adjusted position on the shaft by means of a screw 4. Each hub 3 has an inner end portion 5 which is of larger diameter than the outer end portion and which is offset radially with respect to the shaft, providing an annular space between the shaft 1 and the inner end portion 5 of each hub. At the inner end thereof each hub has an integral, outwardly projecting peripheral flange 6 and each head is provided with a detachable ring 7 attached to the hub by means of bolts 8 and forming an outer peripheral flange. The flanges 6 and 7 of each head provides an outwardly opening peripheral channel between them. An endless air bag 9 is mounted in the channel between the flanges of each head, each air bag being of a size to fit when deflated and flattened upon the enlarged portion 5 of the hub which forms the base of the channel. Each air bag has a stem 10 extending through the enlarged offset portion 5 of the hub into the space between the inner end of the hub and the shaft. Tubes 11 and 12 may be connected to the stems 10 and to a pressure supply tube 13 through which air under pressure may be admitted simultaneously to the two air bags. In the channel of each head there is mounted a relatively thick, solid rubber ring 15 which is of a size to fit between the flanges 6 and 7. The ring 15 is elastic and expansible, surrounds the air bag 9 and is seated exteriorly thereon. The base portions 16 of the rings 15 are somewhat wider than the outer portions of the rings, being of a width to fit snugly between the inner faces of the flanges 6 and 7 and providing shoulders for engagement with inwardly projecting shoulders 17 at the outer edges of the flanges 6 and 7. The inner faces of the flanges 6 and 7 may be formed to converge outwardly at a small angle so that the rings are axially compressed and have tight engagement with the flanges as they are expanded outwardly and move in the channels upon inflation of the air bags.

The spaced heads 2 form supports for opposite ends of an expansible sheet metal body 18 which is of cylindrical form and which is seated exteriorly at its ends upon the expansible rings 15. Each of the heads may be adjusted by loosening the holding screw 4 and sliding the head along the shaft and the overall length of the drum may be varied by so adjusting the heads, the ends of the metal body 18 being slidably seated upon the rings 15.

The metal body 18 is preferably formed of a single metal sheet bent to cylindrical form and having its ends overlapping. The rings 15 are provided with notches 19 to receive the ends of flat bars 20 and 21 attached to the inner face of the sheet forming the metal drum body along the end edges thereof. The sheet metal body is bent to a curvature such that the ends of the sheet normally overlap through a considerable arc, as shown in Fig. 3, the resiliency of the metal tending to hold the cylindrical body in contracted position. When the air bags 15 are inflated the rings 15 are expanded and also the sheet metal body carried by the rings 15.

To limit the expansion and to positively hold the drum to the correct diameter for building a tire carcass thereon, the ends of the metal sheet forming the drum body are provided with interengaging means which are brought into engagement during expansion of the body and prevent further expansion. As shown in Figs. 2, 3 and 4, the bar 20 is shaped to provide a hook which, when the drum is expanded, engages with the bar 21 to limit the expansion. In order to properly position the expansible sheet metal drum body with respect to the heads 2, the sheet metal body has attached thereto adjacent opposite ends guide lugs 22 which project radially inwardly from the interior of the drum body. Each guide lug is provided with a slot 23 which receives a guide pin 24 projecting inwardly from the inner flange 6 of the adjacent head. Each of the guide lugs 22 is adjustably attached to the interior of one of the overlapping ends of the metal sheet forming the body of the drum by means of bolts 25 which pass through elongated slots 26 in the lugs. By loosening the bolts 25 the guide lugs 22 may be adjusted to provide the desired spacing between the heads 2 and to properly center the sheet metal drum body 18 with respect to the heads, the adjustment of the heads being made by loosening the screws 4.

Air bags 9 and ring 15 are assembled in either of the heads 2 by removing the outer flange 7, inserting the deflated air bag upon the inner portion 5 of the hub and the ring 15 exteriorly upon the air bag after which the flange 7 is bolted in place.

Upon inflation of the air bags 9 the rings 15 are expanded to larger diameter, exerting a radial outward pressure upon the sheet metal drum body 18 causing the drum body 18 to expand until locked by engagement of the hook bar 20 with the keeper bar 21. When fully expanded the drum is of proper size for building a tire carcass thereon, the drum being shown expanded in Fig. 1 and contracted in Fig. 5. When the air pressure is released from the air bags 9 the rings 15 are caused by their elasticity to contract and collapse the air bags, and the sheet metal body portion 18 contracts upon the rings 15 by reason of the resiliency of the sheet metal, reducing the external diameter of the drum sufficiently to permit easy removal of a tire carcass A such as illustrated in dotted lines in Fig. 5.

Figure 6:
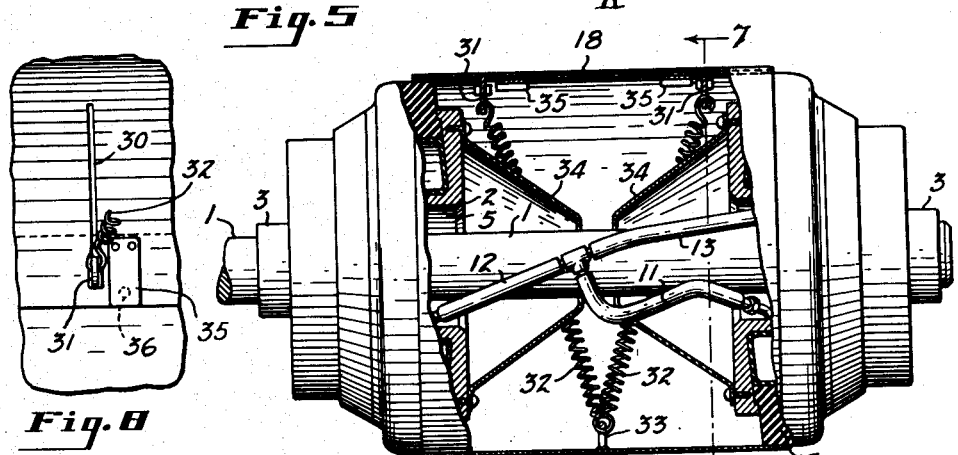
Fig. 6 is a view partly in side elevation and partly in axial section showing a modified construction.
Figures 7, 8:
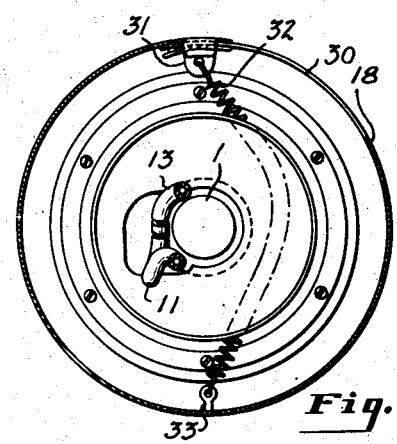
Fig. 7 is a transverse section through the drum, taken on line 7—7 of Fig. 6.
Fig. 8 is a fragmentary view of the exterior of the metal drum body showing one of the lugs and slot connections by means of which the overlapping ends of the sheet metal drum body are kept in proper alignment and by which the expansion of the drum is limited.
Figure 9:
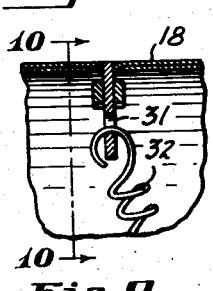
Fig. 9 is a fragmentary sectional view on an enlarged scale showing the inwardly projecting lug and attached spring.
Figure 10:
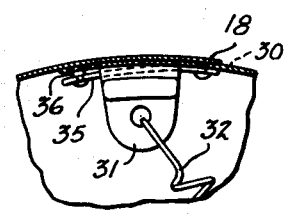
Fig. 10 is a section indicated at 10—10 in Fig. 9.

In Figs. 6 to 10 a slight modification of the invention is shown. In this construction the heads are the same as illustrated and described above. The resilient sheet metal drum body, however, is mounted in a slightly different manner. As shown in Figs. 6 and 8, the overlapping ends of the metal sheet forming the drum body are provided one with spaced elongated circumferential slots 30 and the other with inwardly projecting lugs 31 which slide in the slots. The length of the slots 30 determines the amount of relative movement between the ends of the sheet metal body and the amount of expansion and contraction of the sheet metal body. The lugs 31 and slots 30 are adjacent the ends of the drum and serve to maintain the overlapping ends in proper alinement. In order to provide a greater positive force for contracting the drum, a pair of coil springs 32 are attached one to each of the lugs 31. The opposite ends of the coil springs 32 are attached to a lug 33 positioned substantially midway between the ends of the drum and substantially diametrically opposite the lugs 31. Each of the heads 2 has a conical skirt 34 attached to the inner face thereof, the skirt 34 being concentric with the head and tapering inwardly. The springs 32 are deflected by and bear against the tapering surfaces of the conical skirts 34. The pressure of the springs against these conical surfaces holds the sheet metal body in a position centered with respect to the heads.

In order to reduce the frictional resistance to the sliding of one of the overlapping ends upon the other, leaf springs 35 are attached to the interior of the underlying end and each of these springs has a bearing pin at its outer end which extends through an aperture in the underlying end of the sheet metal body and engages with the interior surface of the overlying end. The springs 35 exert pressure on the bearing pins 36 and relieve the pressure between the contiguous faces of the two overlapping ends. The transfer of pressure to the bearing pins materially reduces the frictional resistance to relieve sliding movements.

The device of the present invention provides a tire building drum which is held in expanded position by pneumatic pressure and which after a tire carcass has been built thereon may be instantly contracted to a diameter sufficiently small to permit the ready removal of the tire carcass by simply relieving the air pressure.

It will be understood that numerous modifications of the construction shown may be resorted to without departing from the spirit of this invention as defined in the appended claims.

What I claim is:

1. A tire building drum comprising an expansible sheet metal drum body, said body comprising a single metal sheet bent to cylindrical form with the ends thereof overlapping, supporting means for said body comprising spaced heads, each having an inflatable annulus for exerting outward pressure upon the interior of said drum body, guide lugs attached to one of said overlapping ends and extending radially inwardly therefrom, and guide members carried by the head with which said lugs slidably engage.

2. A tire building drum comprising a shaft, a pair of spaced heads mounted on said shaft, an annular air bag carried by each head, an expansible elastic rubber ring surrounding and exteriorly seated on each air bag, and an expansible sheet metal drum body of cylindrical form having its opposite ends exteriorly seated upon said rings.

3. A tire building drum comprising a shaft, a pair of spaced heads mounted on said shaft, an annular air bag carried by each head, an expansible elastic rubber ring surrounding and exteriorly seated on each air bag, and an expansible sheet metal drum body of cylindrical form having its opposite ends exteriorly seated upon said rings, said body comprising a single metal sheet bent to cylindrical form with the ends of the sheet overlapping, the ends of said sheet having interengaging members for limiting the expansion of the cylindrical body.

4. A tire building drum comprising a pair of heads, each having an outwardly opening peripheral channel, an annular inflatable air bag in the bottom of each channel, an expansible ring surrounding and seating exteriorly on each bag, and an expansible cylindrical drum body having its ends seated exteriorly upon said rings.

5. A tire building drum comprising a pair of heads, each having an outwardly opening peripheral channel, an annular inflatable air bag in the bottom of each channel, an expansible ring surrounding and seating exteriorly on each bag, and an expansible cylindrical drum body having its ends seated exteriorly upon said rings, said body comprising a resilient metal sheet bent to cylindrical form with its ends overlapping.

6. A tire building drum comprising a pair of heads, each having an outwardly opening peripheral channel, an annular inflatable air bag in the bottom of each channel, an expansible ring surrounding and seating exteriorly on each bag, an expansible cylindrical drum body having its ends seated exteriorly upon said rings, and means for limiting the expansion of said drum body.

7. A tire building drum comprising a pair of heads, each having an outwardly opening peripheral channel, an annular inflatable air bag in the bottom of each channel, an expansible ring surrounding and seating exteriorly on each bag, an expansible cylindrical drum body having its ends seated exteriorly upon said rings, said body comprising a resilient metal sheet bent to cylindrical form with its ends overlapping, and interengaging members carried by the ends of the sheet metal body for limiting the expansion of said body.

8. A tire building drum comprising a pair of heads, each having an outwardly opening peripheral channel, an annular inflatable air bag in the bottom of each channel, an expansible ring surrounding and seating exteriorly on each bag, an expansible cylindrical drum body having its ends seated exteriorly upon said rings, said body comprising a resilient metal sheet bent to cylindrical form with its ends overlapping, and means interposed between said heads and said body for centering said body with respect to the heads.

9. A tire building drum comprising a pair of heads, each having an outwardly opening peripheral channel, an annular inflatable air bag in the bottom of each channel, an expansible ring surrounding and seating exteriorly on each bag, an expansible cylindrical drum body having its ends seated exteriorly upon said rings, said body comprising a resilient metal sheet bent to cylindrical form with its ends overlapping.

10. A tire building drum comprising, a supporting shaft, a pair of heads mounted on the shaft, each having an outwardly opening peripheral channel, an annular air bag mounted in the bottom of each channel, an elastic solid rubber ring fitting in each channel outwardly of the air bag, an expansible sheet metal drum body of cylindrical form slidably seated at its ends on said rings, and means for securing said heads to said shaft in different positions of axial adjustment.

11. A tire building drum comprising, a supporting shaft, a pair of heads mounted on the shaft, each having an outwardly opening peripheral channel, an annular air bag mounted in the bottom of each channel, an elastic solid rubber ring fitting in each channel outwardly of the air bag, an expansible sheet metal drum body of cylindrical form slidably seated at its ends on said rings, said drum body comprising a single sheet of metal bent to cylindrical form and having its ends overlapping, and springs attached interiorly to said drum body for normally contracting the same.

12. A tire building drum comprising, a supporting shaft, a pair of heads mounted on the shaft, each having an outwardly opening peripheral channel, an annular air bag mounted in the bottom of each channel, an elastic solid rubber ring fitting in each channel outwardly of the air bag, an expansible sheet metal drum body of cylindrical form slidably seated at its ends on said rings, said drum body comprising a single sheet of metal bent to cylindrical form and having its ends overlapping, skirts of conical form attached to the inner sides of said drum and coaxial therewith, and a pair of coil springs attached at one end to the interior of the sheet metal body substantially diametrically opposite the overlapping ends and midway between the ends of the body, the opposite ends of the springs being attached to one of the overlapping ends adjacent the ends of the drum body, said springs bearing intermediate their ends upon said conical skirts.

EMIL F. SCHNEDAREK.